US009127624B2

(12) United States Patent
Peters et al.

(10) Patent No.: US 9,127,624 B2
(45) Date of Patent: Sep. 8, 2015

(54) SYSTEMS AND METHODS FOR A HYDRAULICALLY ACTUATED ENGINE VALVE

(75) Inventors: Eric David Peters, Lawrence Park, PA (US); Nicholas Eric Hansen, Lawrence Park, PA (US); Diane Darak, Grove City, PA (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 13/527,622

(22) Filed: Jun. 20, 2012

(65) Prior Publication Data

US 2013/0340430 A1  Dec. 26, 2013

(51) Int. Cl.
| | | |
|---|---|---|
| F02D 23/02 | (2006.01) |
| F02B 33/44 | (2006.01) |
| F02B 37/00 | (2006.01) |
| F01L 9/02 | (2006.01) |
| F02B 33/00 | (2006.01) |
| G01M 11/00 | (2006.01) |
| F02M 25/07 | (2006.01) |
| F02D 29/02 | (2006.01) |
| F02D 41/00 | (2006.01) |
| F02D 41/08 | (2006.01) |
| F02B 37/18 | (2006.01) |
| F02B 29/04 | (2006.01) |
| F02D 41/14 | (2006.01) |
| F02D 41/22 | (2006.01) |

(52) U.S. Cl.
CPC .............. *F02M 25/0779* (2013.01); *F01L 9/02* (2013.01); *F02B 37/18* (2013.01); *F02D 29/02* (2013.01); *F02D 41/0077* (2013.01); *F02D 41/08* (2013.01); *F02B 29/0406* (2013.01); *F02D 41/1408* (2013.01); *F02D 41/221* (2013.01); *F02M 25/0707* (2013.01); *F02M 25/0719* (2013.01); *F02M 25/0722* (2013.01); *F02M 25/0728* (2013.01); *F02M 25/0731* (2013.01); *Y02T 10/144* (2013.01); *Y02T 10/47* (2013.01)

(58) Field of Classification Search
CPC ....................................................... F02D 41/08
USPC .................. 60/602, 605.1, 605.2, 605.3, 611; 123/41.34, 0.12, 90.13, 90.12, 41.44; 73/114.74, 114.77
See application file for complete search history.

(56) References Cited

U.S. PATENT DOCUMENTS

| | | | | |
|---|---|---|---|---|
| 4,005,578 | A * | 2/1977 | McInerney | 60/602 |
| 4,005,579 | A * | 2/1977 | Lloyd | 60/602 |
| 4,346,559 | A * | 8/1982 | Zumstein | 60/606 |
| 4,523,286 | A * | 6/1985 | Koga et al. | 702/183 |
| 4,622,817 | A * | 11/1986 | Kobayashi | 60/608 |
| 4,714,005 | A * | 12/1987 | Leemhuis | 91/361 |
| 5,375,419 | A * | 12/1994 | Wright et al. | 60/607 |
| 5,488,938 | A * | 2/1996 | Ohuchi | 123/568.16 |

(Continued)

FOREIGN PATENT DOCUMENTS

GB        2421983 A  *  7/2006
WO   WO 2007015485 A1  *  2/2007

*Primary Examiner* — Thomas Denion
*Assistant Examiner* — Jessica Kebea
(74) *Attorney, Agent, or Firm* — GE Global Patent Operation

(57) ABSTRACT

Various methods and systems are provided for controlling a hydraulically actuated engine valve. In one example, a system includes a hydraulically actuated engine valve and an engine having a first hydraulic system. The system further includes a second hydraulic system, which is separate from the first hydraulic system, and where the second hydraulic system provides fluid pressure to actuate the valve.

20 Claims, 3 Drawing Sheets

(56) References Cited

U.S. PATENT DOCUMENTS

| | | | |
|---|---|---|---|
| 6,024,075 A * | 2/2000 | Bidner et al. | 123/568.16 |
| 6,041,602 A * | 3/2000 | Dickey | 60/605.2 |
| 6,053,150 A * | 4/2000 | Takahashi et al. | 123/501 |
| 6,148,805 A * | 11/2000 | Bartley et al. | 123/568.28 |
| 6,216,461 B1 * | 4/2001 | Shao et al. | 60/605.2 |
| 6,263,672 B1 * | 7/2001 | Roby et al. | 60/605.2 |
| 6,285,913 B1 * | 9/2001 | Hagglund | 700/45 |
| 6,705,282 B2 | 3/2004 | Hlavac | |
| 6,925,976 B2 | 8/2005 | Israel et al. | |
| 7,866,286 B2 * | 1/2011 | Sun | 123/90.12 |
| 7,877,997 B2 * | 2/2011 | Gruel | 60/602 |
| 8,485,148 B2 * | 7/2013 | Schiemann | 123/90.12 |
| 8,649,961 B2 * | 2/2014 | Hawkins et al. | 701/114 |
| 2003/0010299 A1 * | 1/2003 | Lutz et al. | 123/90.11 |
| 2003/0230266 A1 * | 12/2003 | Ekdahl et al. | 123/90.15 |
| 2009/0025668 A1 * | 1/2009 | Matsusaka et al. | 123/90.17 |
| 2009/0206288 A2 * | 8/2009 | Schiemann | 251/129.01 |
| 2009/0217661 A1 * | 9/2009 | Gruel | 60/602 |
| 2010/0154403 A1 * | 6/2010 | Brickner et al. | 60/452 |
| 2010/0307433 A1 * | 12/2010 | Rust et al. | 123/90.12 |
| 2011/0113775 A1 * | 5/2011 | Lilly | 60/605.2 |
| 2013/0042476 A1 * | 2/2013 | Carter et al. | 29/890.12 |
| 2013/0103209 A1 * | 4/2013 | Beck | 700/282 |
| 2014/0053548 A1 * | 2/2014 | Peters | 60/602 |

* cited by examiner

SYSTEMS AND METHODS FOR A HYDRAULICALLY ACTUATED ENGINE VALVE

FIELD

Embodiments of the subject matter disclosed herein relate to engines with hydraulic systems. Other embodiments relate to controlling an engine valve via the hydraulic systems.

BACKGROUND

Engine systems may include hydraulic systems with hydraulically actuated valves, such as intake and exhaust valves of an engine cylinder, exhaust gas recirculation valves, and wastegates. In some examples, a fluid flowing through the hydraulic system to actuate the hydraulically actuated valves may be engine oil, which varies in pressure and temperature based on operating conditions of the engine. In such a configuration, there may be a high degree of valve control variability due to fluctuating engine oil temperature and pressure. As such, control capability of the hydraulically actuated valves may be reduced.

BRIEF DESCRIPTION

Thus, in one embodiment, an example system includes a hydraulically actuated engine valve and an engine having a first hydraulic system. The system further includes a second hydraulic system, which is separate from the first hydraulic system, and wherein the second hydraulic system provides fluid pressure to actuate the valve. In such an example, because the second hydraulic system is separate from the first hydraulic system, hydraulic fluid that flows through the second system does not mix with and may be different than hydraulic fluid flowing through the first hydraulic system. In this manner, engine oil may circulate through the first hydraulic system and a fluid other than engine oil may circulate through the second hydraulic system. Thus, fluid (e.g., oil) pressure and temperature in the second hydraulic system may be independent of the engine oil pressure and temperature. As such, the hydraulically actuated engine valve may be accurately controlled even when the engine oil pressure and/or temperature are not at an appropriate pressure or temperature for control, such as when the oil pressure is low, for example, during idle conditions or when the engine is not cranking.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for controlling an engine valve in an engine system with first and second hydraulic systems. In one example, a system comprises a hydraulically actuated engine valve, an engine having a first hydraulic system, and a second hydraulic system. The second hydraulic system is separate from the first hydraulic system, and the second hydraulic system provides fluid pressure to actuate the valve. In such an example, hydraulic fluid in the first hydraulic system does not mix with hydraulic fluid in the second hydraulic system. In one example, the first hydraulic system may include a first pump driven by a crankshaft of the engine and the second hydraulic system may include a second, electrically driven pump. Thus, a speed of the first pump is dependent on a speed of the engine and a speed of the second, electrically driven pump is not. As such, a pressure of the hydraulic fluid circulating through the second hydraulic system may be maintained at an appropriate pressure for valve control, even during conditions when the engine is off or operating at a relatively low speed.

In one embodiment, the first and second hydraulic systems may be coupled to an engine in a vehicle. In some embodiments, a locomotive system may be used to exemplify one of the types of vehicles having engines to which the first and second hydraulic system may be attached. Other types of vehicles may include on-highway vehicles and off-highway vehicles other than locomotives or other rail vehicles, such as mining equipment and marine vessels. Other embodiments of the invention may be used for hydraulic systems that are coupled to stationary engines. The engine may be a diesel engine, or may combust another fuel or combination of fuels. Such alternative fuels or combinations of fuels may include gasoline, kerosene, biodiesel, natural gas, and/or ethanol. Suitable engines may use compression ignition and/or spark ignition.

Figure 1:
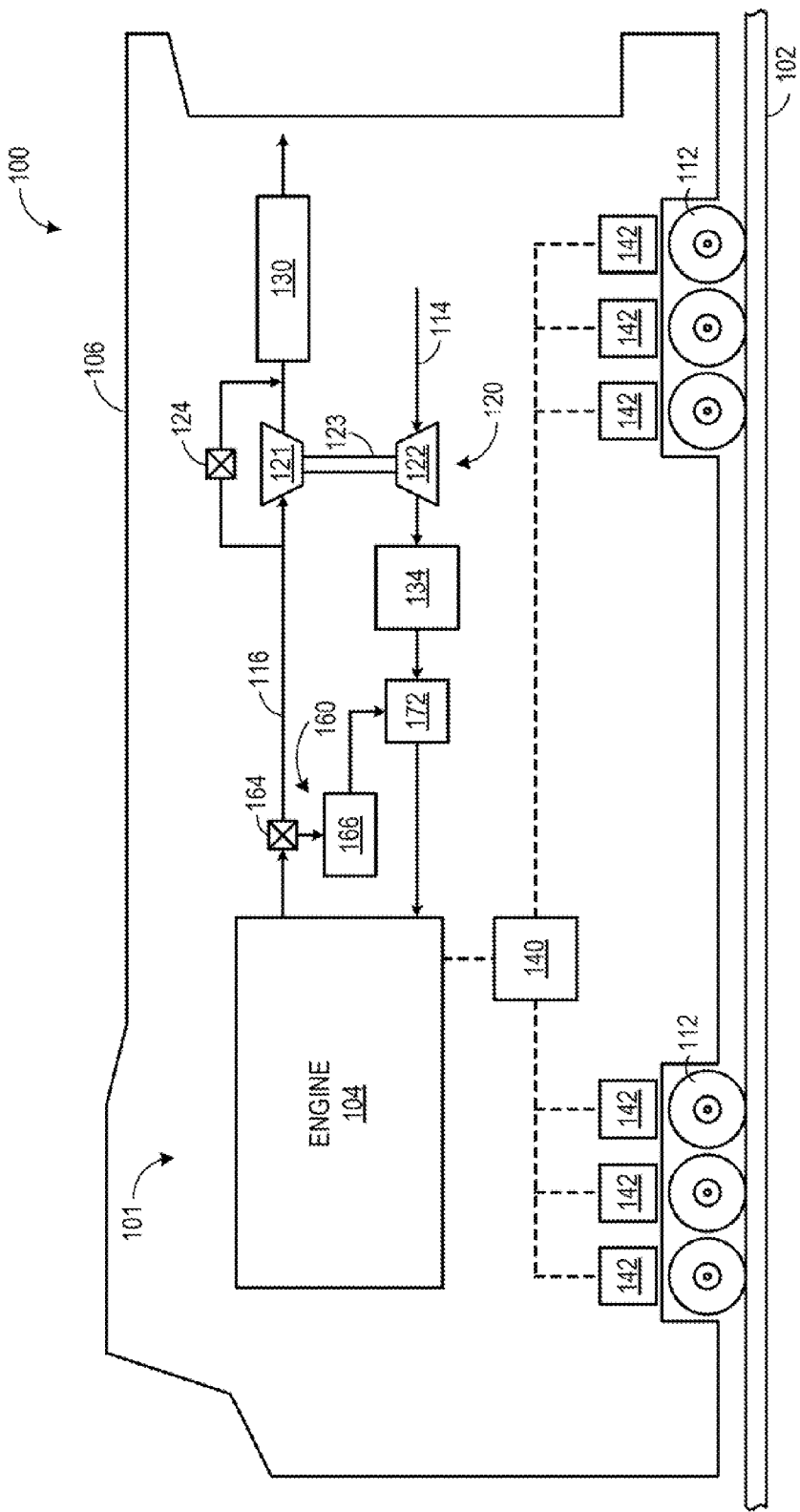
FIG. 1 shows a schematic diagram of an engine system.

FIG. 1 shows a block diagram of an exemplary embodiment of a vehicle system 100, herein depicted as a rail vehicle 106 (e.g., locomotive), configured to run on a rail 102 via a plurality of wheels 112. As depicted, the rail vehicle 106 includes an engine system 101 with an engine 104, such as an internal combustion engine.

The engine 104 receives intake air for combustion from an intake, such as an intake passage 114. The intake may be any suitable conduit or conduits through which gases flow to enter the engine. The intake passage 114 receives ambient air from an air filter (not shown) that filters air from outside of a vehicle 106 in which the engine 104 is positioned. Exhaust gas resulting from combustion in the engine 104 is supplied to an exhaust, such as exhaust passage 116. The exhaust may be any suitable conduit through which gases flow from the engine. Exhaust gas flows through the exhaust passage 116 to an exhaust stack (not shown) and to atmosphere, for example.

As depicted in FIG. 1, the engine system includes an exhaust gas recirculation (EGR) system 160, which routes exhaust gas from the engine 104 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$), for example. The EGR system 160 includes an EGR valve 164 to control a flow of exhaust gas from the engine 104 to the exhaust passage 116 and intake passage 114. The EGR valve 164 may be a hydraulically actuated valve, for example, such as a three way valve, a butterfly valve, or the like. In other examples, the EGR valve 164 may be an on/off valve or may control a variable amount of EGR. As depicted in the exemplary embodiment shown in FIG. 1, the EGR system 160 further includes a heat exchanger such as an EGR cooler 166 to reduce a temperature of (e.g., cool) the exhaust gas before the exhaust gas returns to the intake passage 114. The EGR cooler 166 may be an air-to-liquid heat exchanger, for example. In such an example, one or more charge air coolers 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass (not shown).

As shown in FIG. 1, the engine system 101 further includes an EGR mixer 172 which mixes the recirculated exhaust gas with charge air such that the exhaust gas may be evenly distributed within the charge air and exhaust gas mixture. In the exemplary embodiment depicted in FIG. 1, the EGR system 160 is a high-pressure EGR system which routes exhaust gas from a location upstream of a turbocharger 120 in the exhaust passage 116 to a location downstream of the turbochargers 120 in the intake passage 114. In other embodiments, the engine system 101 may additionally or alternatively include a low-pressure EGR system which routes exhaust gas from downstream of the turbochargers 120 in the exhaust passage 116 to a location upstream of the turbocharger 120 in the intake passage 114.

As depicted in FIG. 1, the engine system 101 further includes the turbocharger 120 arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 includes a turbine 121 and a compressor 122 which are mechanically coupled via a shaft 123. In the exemplary embodiment shown in FIG. 1, the turbocharger 120 is provided with a wastegate 124, which is controllable for selectively bypassing exhaust gas around the turbocharger 120. (Wastegate refers to a valve or other element that is controllable for this purpose.) The wastegate 124 may be opened, for example, to divert the exhaust gas flow away from the turbine 121. In this manner, the rotating speed of the compressor 122, and thus the boost provided by the turbocharger 120 to the engine 104 may be regulated during steady state conditions. In other embodiments, the engine system 101 may include a two-stage turbocharger with a first turbocharger operating at a relatively higher pressure and a second turbocharger operating at a relatively lower pressure. In such an example, each of the turbochargers may be provided with a wastegate, or only the first or second turbocharger may be provided with a wastegate.

The engine system 101 further includes an exhaust treatment system 130 coupled in the exhaust passage in order to reduce regulated emissions. As depicted in FIG. 1, the exhaust gas treatment system 130 is disposed downstream of the turbine 121 of the turbocharger 120. In other embodiments, an exhaust gas treatment system may be additionally or alternatively disposed upstream of the turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

Further, as depicted in FIG. 1, the engine system 101 includes a generator 140 which is mechanically coupled to the engine 104. For example, the engine 104 is a diesel engine that generates a torque output that is transmitted to the generator 140. The generator 140 produces electrical power that may be stored and applied for subsequent propagation to a variety of downstream electrical components. As an example, the generator 140 may be electrically coupled to a plurality of traction motors 142 coupled to each of the wheels 112 of the vehicle 106, and the generator 140 may provide electrical power to the plurality of traction motors 142. As depicted, the plurality of traction motors 134 are each connected to one of a plurality of wheels 112 to provide tractive power to propel the rail vehicle 106.

Figure 2:
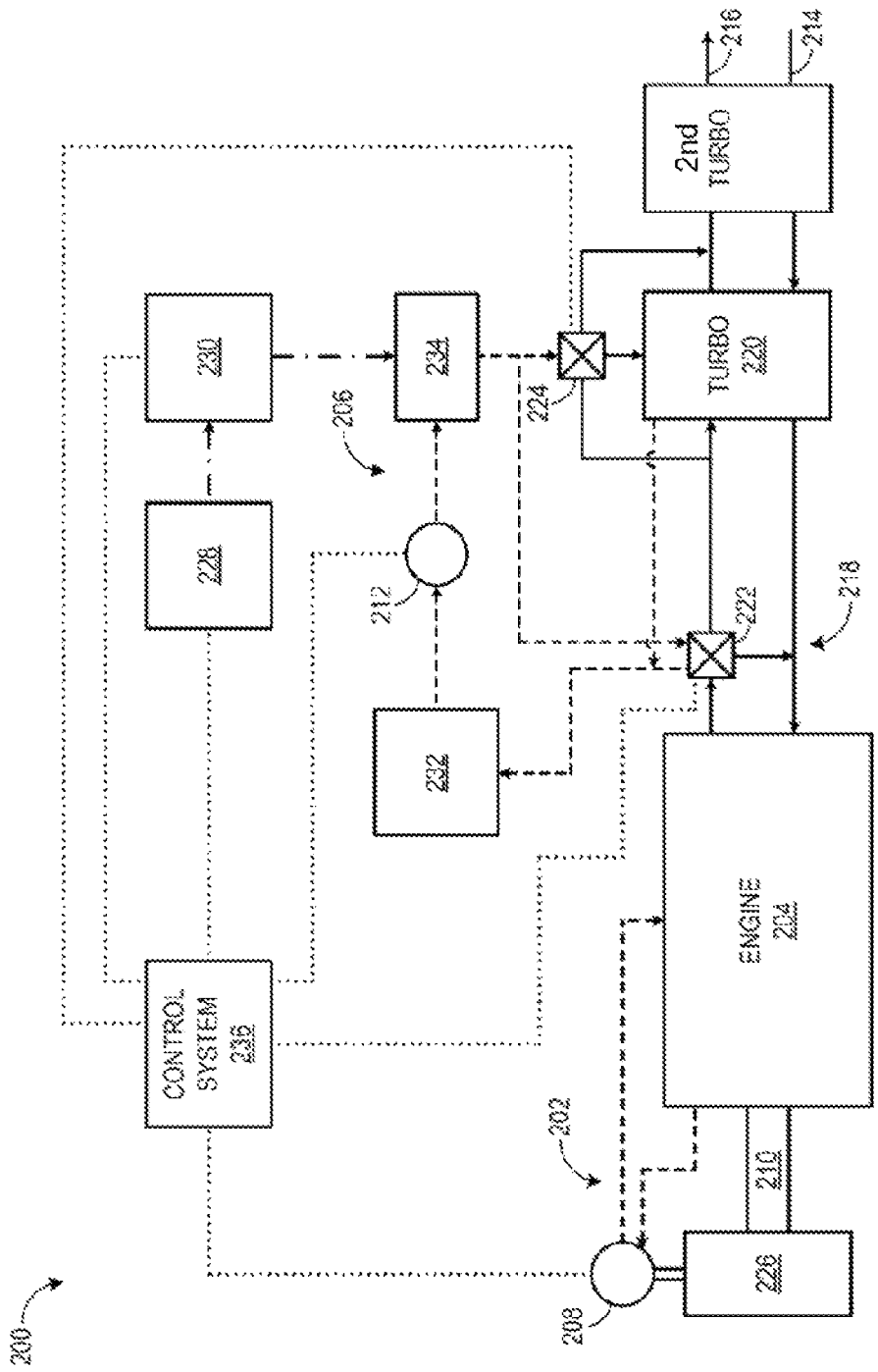
FIG. 2 shows a schematic diagram of an engine with first and second hydraulic systems.

According to an embodiment of the invention, FIG. 2 shows an engine system 200 with a first hydraulic system 202, and engine 204, and a second hydraulic system 206. As depicted, the first hydraulic system 202 includes a first pump 208 which is driven by a crankshaft 210 of the engine 204 and the second hydraulic system 206 includes a second pump 212 that is electrically driven.

The engine 204 may be an internal combustion engine, such as engine 104 described above with reference to FIG. 1. Like engine 104, engine 204 receives intake air for combustion from an intake passage 214 and exhausts gas resulting from combustion via an exhaust passage 216. The engine system 200 further includes an EGR system 218 with an EGR valve 222 operable to route exhaust gas from the exhaust passage 216 to the intake passage 214, such as the EGR system 160 described above, and a turbocharger 220 with a wastegate 224, such as the turbocharger 120 described above.

In the example depicted in FIG. 2, the first hydraulic system 202 includes the pump 208 which is driven by the crankshaft 210 of the engine 204 via a front end accessory drive 226. The pump 208 circulates hydraulic fluid through the first hydraulic system 202. In one example, the hydraulic fluid in the first hydraulic system 202 may be engine oil. The temperature of the engine oil may depend on the engine components through which the oil passes, for example. Further, in such a configuration, the pressure of the engine oil depends on the speed of the pump, and therefore, the speed of the engine. In other examples, the hydraulic fluid may be another suitable fluid.

As shown, the second hydraulic system 206 is separate from the first hydraulic system 202. According to one aspect, the term "separate" indicates the fluid from the first hydraulic system 202 does not mix with fluid from the second hydraulic system 206 and the systems are pressurized via different pumps. As such, the first hydraulic system 202 and the second hydraulic system 206 may operate using different types of hydraulic fluid. In some examples, the first hydraulic system 202 and the second hydraulic system 206 may operate using the same type of fluid. In one example, the hydraulic fluid in the second hydraulic system 206 may have increased thermal and reduced combustibility qualities as compared to engine oil or to the hydraulic fluid in the first hydraulic system (if other than engine oil).

In the example depicted in FIG. 2, the second hydraulic system 206 is pressurized by the second, electrically driven pump 212. The electrically driven pump 212 may receive power from the main DC bus on the vehicle. As an example, the DC bus may be approximately 72 volts. In other examples, the DC bus may be greater than or less than 72 volts. As shown, an alternator 228 may generate AC which is converted to DC by a rectifier 230 and supplied to the electrically driven pump 212. In other examples, a variable speed AC motor may be used to supply power to the electrically driven pump 212.

For example, the power may be converted back to AC by an inverter or may be supplied directly from the alternator 228.

Hydraulic fluid which circulates through the second hydraulic system 206 is stored in a fluid reservoir 232. In an embodiment, the hydraulic fluid is pumped from the fluid reservoir 232 by the electrically driven pump 212 and distributed to a heat exchanger 234. The heat exchanger 234 may be a liquid-to-liquid heat exchanger or an air-to-liquid heat exchanger, for example, which cools the hydraulic fluid before it flows to a valve. As depicted in FIG. 2, the hydraulic fluid flows from the pump and to the wastegate 224 positioned around the turbocharger 220 as well as to the EGR valve 222. In some embodiments, a valve may be disposed in the second hydraulic system 206 to control the distribution of hydraulic fluid between the wastegate 224 and the EGR valve 222. In other embodiments, the second hydraulic system 206 may only supply the EGR valve 222 or the wastegate 224 with hydraulic fluid. (Thus, the second hydraulic system 206 supplies hydraulic fluid to one or more valves that are fluidly coupled, directly or indirectly, as part of the second hydraulic system.)

In such a configuration, the fluid pressure in the second hydraulic system 206 is controlled by the electrically driven pump 212. As such, the pressure is not dependent on the speed of the engine 204, for example. In this way, repeatable control of the one or more valves may be improved, for example. Further, pressure may be applied to the one or more valves even when the engine is not running or when the engine speed is relatively low, which allows for calibrating a position feedback sensor, for example, as will be described in greater detail below with reference to FIG. 3. Further, a temperature of the hydraulic fluid in the second hydraulic system 206 may be controlled via the heat exchanger 234. As such, heat transfer from the one or more valves may be controlled to a desired setpoint, for example. Moreover, if the engine shuts down, engine oil may stop flowing through the first hydraulic system 202 and heat soaking of engine components may occur. For example, during heat soaking, a temperature of the engine components, such as one or more valves, may increase for a duration after the engine is shut down as the flow of cooling medium (e.g., the engine oil actuating a valve) is abruptly stopped, yet significant heat is still present from the immediately preceding operation. In the configuration shown in FIG. 2, however, hydraulic flow may be maintained in the second hydraulic system 206 after engine shutdown for continued heat rejection.

In the exemplary embodiment shown in FIG. 2, the hydraulic fluid in the second hydraulic system 206 is further pumped through the turbocharger 220 before it returns to the fluid reservoir 232. For example, because the hydraulic fluid has been cooled by the heat exchanger 234, the hydraulic fluid not only lubricates, but may also provide cooling to parts of the turbocharger 220 such as bearings of the turbocharger 220. In other examples, hydraulic fluid from the second hydraulic system 206 may not provide cooling to the turbocharger 220.

The engine system 200 further includes a control system 236 which is provided and configured to control various components related to the engine system 200. In one example, the control system 236 includes a computer control system. The control system 236 further includes non-transitory, computer readable storage media (not shown) including code for enabling on-board monitoring and control of engine operation. The control system 236, while overseeing control and management of the engine system 200, may be configured to receive signals from a variety of engine sensors, as further elaborated herein, in order to determine operating parameters and operating conditions, and correspondingly adjust various engine actuators to control operation of the engine system 200. For example, the control system 236 may receive signals from various engine sensors including, but not limited to, engine speed, engine load, boost pressure, ambient pressure, exhaust temperature, exhaust pressure, etc. Correspondingly, the control system may control the engine system 200 by sending commands to various components such as the alternator 228, the heat exchanger 234, the pumps 208 and 212, the wastegate 224, the EGR valve 222, other valves or flow control elements, etc.

As an example, the control system 236 may receive signals from an engine speed sensor indicating the engine speed. The control system 236 may control the EGR valve 222 or the wastegate 224 based on the engine speed. For example, in embodiments, when the engine speed is zero (i.e., the engine is off and the engine output shaft is not spinning with the engine at rest), a calibration routine may be carried out for position sensors associated with the valves. As another example, in embodiments, additionally or alternatively, when the engine speed is less than a threshold speed, such as when the engine is at idle, the EGR valve 222 and/or the wastegate 224 may be dithered in order to reduce corrosion and extend the life of the valves.

In an exemplary embodiment, a system comprises a hydraulically actuated engine valve and an engine with a first hydraulic system. The system further comprises a second hydraulic system, separate from the first hydraulic system, where the second hydraulic system provides fluid to actuate the valve. The system further comprises a control system configured to, during a first condition, range the valve through a range of motion, during a second condition, adjust the valve to a desired position, and during a third condition, dither the valve.

The first condition may include conditions in which the valve is not currently being used by the system. The second condition may include conditions in which the valve was not being used by the system and is beginning to be used by the system. The third condition may include conditions in which a valve position may be varied. In one example, the first condition is an engine off condition of the engine, the second condition is an engine start condition of the engine, and the third condition is an engine idle condition of the engine.

In some embodiments, the second hydraulic system further includes a heat exchanger operable to cool fluid flowing through the second hydraulic system before it is supplied to the valve. In another embodiment, the system further includes a turbocharger coupled to the engine, and wherein the second hydraulic system further includes a heat exchanger operable to cool fluid flowing through the second hydraulic system before it enters the turbocharger.

As another example, the first hydraulic system may be mechanically coupled to a crankshaft of an engine of the engine system via a first pump. Further, the second hydraulic system includes a second, electrically driven pump. A speed of the first pump is proportional to a speed of the engine, while a speed of the second, electrically driven pump is not controlled proportionally to the speed of the engine.

Figure 3:
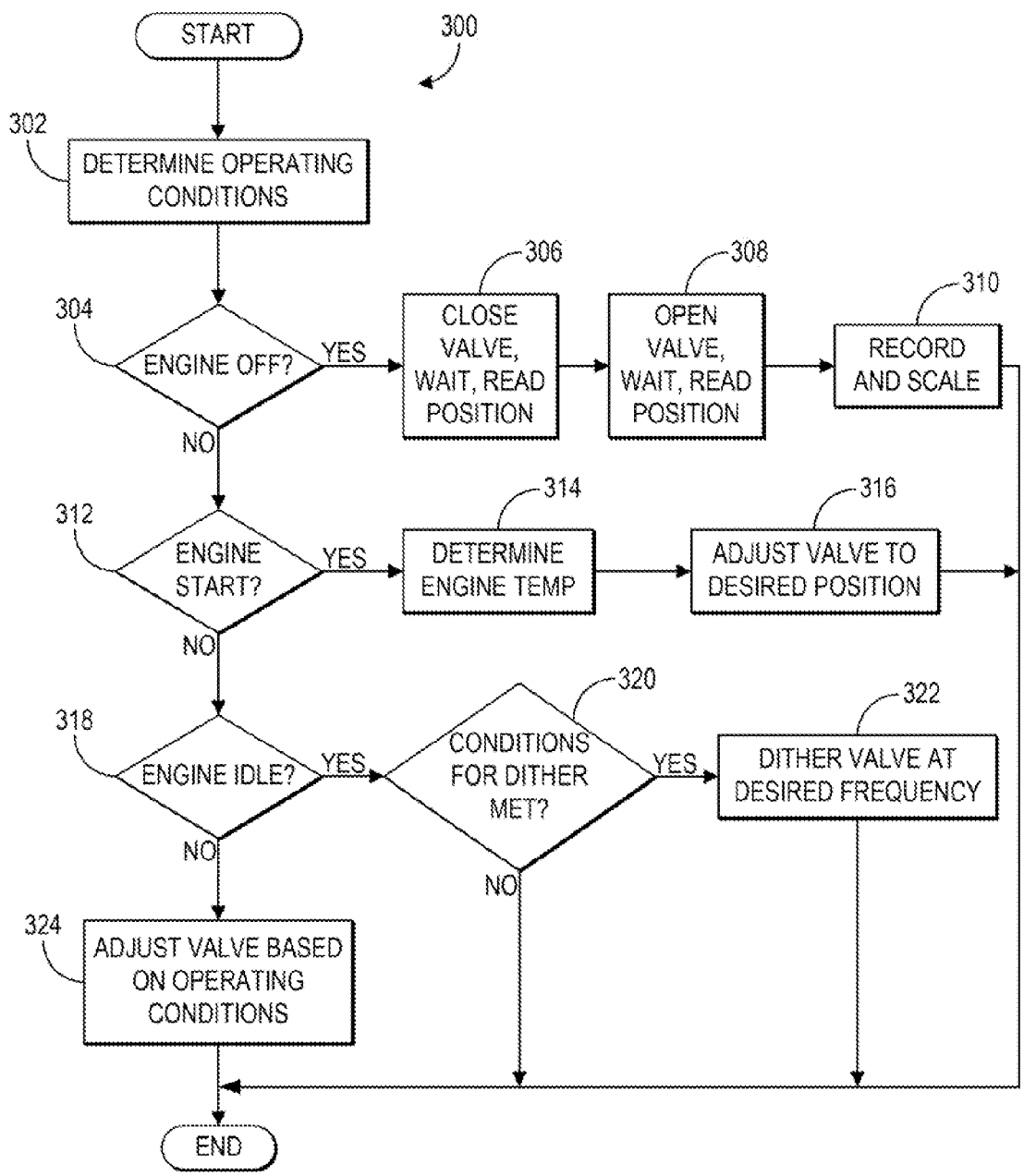
FIG. 3 shows a flow chart illustrating a method for controlling a hydraulically actuated valve.

FIG. 3 shows a flow chart illustrating a method 300 for an engine system with a hydraulically actuated valve and first and second hydraulic systems, such as the engine system 200 described above with reference to FIG. 2. Specifically, the method determines an operating condition of the engine and adjusts the valve based on the operating condition. For example, the valve may be controlled differently when the engine is off, starting, or at idle. In such examples, the engine oil temperature and/or pressure may be relatively low, such that accurate control of the valve would be reduced if the hydraulic fluid circulating through the hydraulic system fluidically coupled to the valve was engine oil, such as provided by the first hydraulic system 202 described above with reference to FIG. 2. When the valve is part of a hydraulic system that does not receive engine oil, however, such as the second hydraulic system 206 described above with reference to FIG. 2, pressure and/or temperature of the hydraulic fluid may be maintained even when an engine operating condition varies. That is, pressure and/or temperature of the hydraulic fluid may be maintained independent of operation of the engine. As such, the valve may continue to be robustly controlled during a wide range of engine operating conditions and engine oil pressures and/or temperatures. The method 300 is described using an EGR valve as an example of the hydraulically actuated valve. It should be understood, however, that the method may be applied to any suitable hydraulically actuated valve, such as a wastegate as described above, for example. (Valve refers to a device that is controllable to vary flow of a fluid through a passage or otherwise from one location to another. For example, a valve may be controllable to vary flow from zero/no flow, such as when the valve is fully closed, to 100% flow, such as when the valve is fully open. Hydraulically actuated valve refers to a valve that is controllable via application of a hydraulic fluid to a control input of the valve.)

At step 302, operating conditions are determined. The operating conditions may include engine speed, engine load, temperature, or the like. For example, an appropriate operating temperature or pressure of the hydraulic fluid in the second hydraulic system may depend on the engine load or temperature.

At step 304 of the method, it is determined if the engine is off (i.e., in an engine off condition). Engine off conditions may include conditions in which the engine output shaft is not spinning and/or the engine is not combusting. For example, when the engine is off, the engine is at rest and ignition does not occur in the cylinders of the engine.

If it is determined that the engine is off, the valve is ranged at steps 306 and 308. For example, at step 306, the valve is closed (e.g., controlled to a fully closed position), the system waits for a predetermined duration, and the position of the valve is read by a position sensor. At step 308, the valve is opened (e.g., controlled to a fully open position), the system waits for a predetermined duration, and the position of the valve is read by the position sensor. For example, the valve may be ranged through a full range of motion from fully open to fully closed, or through a partial range of motion that is less than the full range of motion, such as from near open to near closed (e.g., 95% range of motion, or otherwise), in order to calibrate a position feedback sensor. (According to one aspect, "near" open or closed means at or within 5% of fully open or closed, but not fully open or closed.) In some examples, the readings may be determined at different pressures in the second hydraulic system. For example, the second hydraulic system may be operating at a different pressure after engine shutdown based on an operating temperature of the engine system just prior to shutdown. As such, the position sensor may be scaled for various operating pressures of the second hydraulic system. By ranging the valve when the engine is off and air, such as exhaust gas, is not flowing through the valve or putting pressure on the valve, repeatability of the valve may be improved. Once the valve is ranged, the range of motion is recorded by a controller and the controller scales valve commands accordingly at step 310. The controller may be part of a control system, such as the control system 236 described above with reference to FIG. 2. By scaling the valve commands, the range of motion of the valve is updated such that control of the valve may be carried out with increased precision and better utilizing the full extent of valve opening and closing. For example, if the valve is 97% open when commanded to be fully open, the controller can recalibrate the valve command so that the valve is open only 100% when commanded to be open 100%. As such, repeatability and, therefore, reliability of the valve may be extended over the lifetime of the valve.

On the other hand, if it is determined that the engine is not off (i.e., not in an engine off condition), the method moves to step 312 where it is determined if the engine is under starting conditions. Engine start conditions may include engine oil temperature less than a threshold temperature, engine temperature less than a threshold temperature, within a designated time period of when an engine is activated, or the like.

If it is determined that the engine is under starting conditions, the method proceeds to step 314 where the engine temperature is determined. As step 316, the valve is adjusted to a desired position. As such, the valve may be pre-positioned to an optimal or appropriate position for engine starting. As an example, greater or lesser amounts of EGR may be desired during engine start-up in order to reduce $NO_x$ emissions depending on operating conditions, as compared with engine running conditions. For example, depending on engine temperature, EGR cooler temperature, and other operating conditions, the valve may be adjusted to different start positions during engine cranking and run-up.

In the exemplary embodiment shown in FIG. 2, during startup, the air fuel ratio (AFR) of the engine needs to be higher than in some other modes of operation, so EGR is usually not used. For doing so, the EGR valve 222 is closed such that flow is not allowed through the EGR system 218. When running at cold temperatures or low loads, in embodiments, EGR is not used or only used sparingly, so the EGR valve 222 would be closed or partially open, for example. When running at steady state load points, specific amounts of EGR may be needed to meet emissions requirements, so the EGR valve 222 will be set to whichever position, partially open or fully open, will provide the correct amount of EGR flow for meeting emissions requirements. Thus, the valve may be adjusted to a position for a desired amount of EGR.

On the other hand, if it is determined that the engine is not under starting conditions, the method moves to step 318 where it is determined if the engine is under idle conditions. Idle conditions may include conditions where the engine is unloaded in that the generator is not generating electrical power, such that the engine maintains a desired idle speed. For example, it may be determined that the engine is under idle conditions if the engine speed is less than a threshold speed and/or if the vehicle speed is less than a threshold speed, for example, possibly in correlation to the engine starting condition. (For example, if the vehicle speed is zero and a designated time period has elapsed since the engine starting condition, then this is indicative of the engine being in an idle condition.)

If it is determined that the engine is under idle conditions, the method continues to step 320 where it is determined if conditions for dithering the valve are met. Conditions for dithering the valve may include exhaust temperature, EGR amount, engine operation preceding the idle condition, duration of engine operation, and/or the like. As one example, if the amount of EGR is less than a threshold and the engine was operating with a load less than a threshold before the idle, dithering of the valve may not be carried out. As another example, if the exhaust temperature is greater than a threshold and/or if the engine has been operating for greater than a threshold duration, dithering of the valve may be carried out.

If it is determined that the conditions for dithering the valve are met, the method continues to step 322 where the valve is maintained in a desired idle position, such as closed or partially or fully open, yet the valve is dithered at a desired frequency. When the valve is dithered, it is oscillated with an amplitude at the desired frequency such that it does not move within 1 or 2% of the desired idle position, for example. The desired frequency may be determined based on the type of valve, valve location, or the like to be significantly above the bandwidth of the valve actuation, for example an order of magnitude higher than the valve's bandwidth, or the bandwidth of the engine. For example, the engine may not respond to airflow changes an order of magnitude above the firing frequency at idle.

In one example, the desired dither frequency is based on temperature, such as valve temperature or engine temperature, and/or based on the valve position if it is at least partially open. In another example, the dither frequency may be based on the current pressure in the hydraulic system. During steady state operation, an EGR system environment may be exposed to a high amount of corrosive or incomplete combustion components and, over time, may lead to valves sticking open or closed. By dithering the valve during idle conditions when the engine load is relatively low, valve sticking during steady state conditions may be reduced. Further, the valve may be dithered for varying durations depending on the operating conditions. For example, the valve may be dithered for a longer duration when the engine has been operating above a threshold load for greater than a threshold duration. As another example, the valve may be dithered for a longer duration if the exhaust temperature is greater than a threshold temperature or based on an amount of EGR.

If it is determined that the engine is not under idle conditions, the method moves to step 324 and the engine valve is adjusted based on operating conditions. As an example, the valve may be adjusted to be more open or more closed based on $NO_x$ emissions from the engine, based on engine speed, engine load, or other operating parameters.

Further, the system may operate the electrically driven pump to control pressure in the second hydraulic system differently while the engine is off, starting, at idle, and during other operation. As an example, the second hydraulic system may operate with a higher pressure during warmed-up engine operation when the valve is adjusted based on the operating conditions than when the valve is dithered during idle engine operation or when the valve is ranged while the engine is off.

Thus, by including the valve in a second hydraulic system that has hydraulic fluid that does not mix with engine oil or other hydraulic fluid of a first hydraulic system (e.g., primary hydraulic system of an engine that supplies the engine with fluid for piston lubrication or the like), the valve may be controlled during engine conditions in which the engine oil may not be at an appropriate pressure for accurate valve control. For example, instead of waiting for a full start-up and pre-lube procedure to be carried out, the valve may be adjusted to an appropriate position before the engine is warmed-up since the second hydraulic system does not rely on engine oil pressure. Further, because the second hydraulic system is not dependent on engine oil pressure, the valve may undergo a calibration routine or diagnostic when the engine is off or at idle.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   in an engine system having a first hydraulic system and a second hydraulic system that is separate from the first hydraulic system, where a first hydraulic fluid of the first hydraulic system does not mix with a second hydraulic fluid of the second hydraulic system, sending a signal from a controller including non-transitory computer readable storage media to an actuator to:
   actuate a hydraulically actuated engine valve with the second hydraulic fluid, where an electrically driven pump provides fluid pressure to actuate the valve and where the valve is external to a combustion chamber of the engine system;
   range the valve through at least a partial range of motion and record and scale the range of motion based on feedback from a position feedback sensor of the valve while continuing to provide fluid pressure to the second hydraulic fluid with the electrically driven pump during a first condition when the engine is off;
   adjust the valve to a desired position during a second condition; and
   dither the valve during a third condition.

2. The method of claim 1, further comprising receiving one or more signals at the controller of engine speed and temperature and determining an engine operating condition based on the received signals and wherein the second condition is an engine start condition of the engine and the third condition is an engine idle condition of the engine.

3. The method of claim 1, further comprising maintaining a temperature variation in the second hydraulic system over an engine speed range of an engine of the engine system.

4. The method of claim 1, further comprising actuating the valve to control exhaust gas flow in an exhaust gas recirculation system coupled to an engine of the engine system.

5. The method of claim 1, further comprising driving a first pump via a crankshaft of an engine of the engine system in the first hydraulic system, and driving a second, electrically driven pump in the second hydraulic system to actuate the valve.

6. The method of claim 5, further comprising providing fluid to bearings of a turbocharger coupled to the engine via the second, electrically driven pump.

7. The method of claim 5, further comprising operating the first pump and the second, electrically driven pump at different speeds, and maintaining pressure in the second hydraulic system when the engine is off.

8. The method of claim 7, wherein a speed of the first pump is proportional to a speed of the engine, and a speed of the second, electrically driven pump is not controlled proportionally to the speed of the engine.

9. A system, comprising:
a hydraulically actuated engine valve;
an engine with a first hydraulic system including a first pump driven by a crankshaft of the engine;
a second hydraulic system, separate from the first hydraulic system where a second hydraulic fluid flowing through the second hydraulic system does not mix with a first hydraulic fluid flowing through the first hydraulic system, where the second hydraulic system provides fluid pressure to actuate the valve with a second, electrically driven pump; and
a control system with non-transitory, computer readable storage media for actuating a valve actuator to, during a first condition when the engine is not cranking, range the valve through a range of motion and record and scale the range of motion based on feedback from a feedback position sensor of the valve, during a second condition, adjust the valve to a desired position, and during a third condition, dither the valve.

10. The system of claim 9, wherein the control system determines an engine operating condition based on one or more of engine speed and temperature, wherein the first condition is an engine off condition of the engine, the second condition is an engine start condition of the engine, and the third condition is an engine idle condition of the engine, and wherein the valve is external to a combustion chamber of the engine.

11. The system of claim 9, wherein the second hydraulic system further includes a heat exchanger operable to cool fluid flowing through the second hydraulic system before it is supplied to the valve.

12. The system of claim 9, further including a turbocharger coupled to the engine, and wherein the second hydraulic system further includes a heat exchanger operable to cool fluid flowing through the second hydraulic system before it enters the turbocharger.

13. The system of claim 9, wherein the engine is configured to combust diesel and natural gas.

14. The system of claim 9, further comprising:
an intake passage coupled to the engine for routing intake air to the engine for combustion;
an exhaust passage coupled to the engine;
an exhaust gas recirculation system operable to route exhaust gas from the exhaust passage to the intake passage; and
a first turbocharger arranged between the intake passage and the exhaust passage, the first turbocharger having a compressor for increasing a pressure of the intake air drawn into the intake passage and a turbine, configured to be driven by the exhaust gas, for driving the compressor.

15. The system of claim 14, further comprising a second turbocharger operably coupled to first turbocharger, the intake passage, and the exhaust passage, wherein the first turbocharger is configured to operate at a relatively higher pressure than the second turbocharger and the second turbocharger is configured to operate at a relatively lower pressure than the first turbocharger.

16. A vehicle comprising the system of claim 9.

17. A vehicle comprising:
an engine with a first hydraulic system including a first pump driven by a crankshaft of the engine;
a generator configured to generate electrical power;
one or more traction motors configured to receive the electrical power from the generator for propelling the vehicle;
a hydraulically actuated engine valve;
a second hydraulic system, separate from the first hydraulic system where a second hydraulic fluid flowing through the second hydraulic system does not mix with a first hydraulic fluid flowing through the first hydraulic system, where the second hydraulic system provides fluid pressure to actuate the valve with a second, electrically driven pump; and
a control system with non-transitory, computer readable storage media for actuating a valve actuator to, during a first condition when the engine is not cranking, range the valve through a range of motion and record and scale the range of motion based on feedback from a feedback position sensor of the valve, during a second condition, adjust the valve to a desired position, and during a third condition, dither the valve.

18. The vehicle of claim 17, further comprising plural wheels operably coupled to the one or more traction motors.

19. The vehicle of claim 18, wherein the vehicle is a rail vehicle, and the wheels are configured to run on a rail.

20. The vehicle of claim 17, wherein the vehicle is a marine vessel.

* * * * *